(12) United States Patent
Garry et al.

(10) Patent No.: US 7,581,722 B2
(45) Date of Patent: Sep. 1, 2009

(54) WORK SUPPORT

(75) Inventors: Ian Murray Garry, Leicestershire (GB); Yan Wang, Nottingham (GB); Jianfan Xie, Manchester (GB); Nabil Gindy, Leicester (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 11/971,229

(22) Filed: Jan. 9, 2008

(65) Prior Publication Data
US 2008/0185488 A1  Aug. 7, 2008

(30) Foreign Application Priority Data
Feb. 3, 2007  (GB)  ................... 0702087.8

(51) Int. Cl.
*B23Q 3/00* (2006.01)
(52) U.S. Cl. ........................ 269/296; 269/289 R; 269/47
(58) Field of Classification Search ................. 269/296, 269/289 R, 303, 291, 900
See application file for complete search history.

(56) References Cited

U.S. PATENT DOCUMENTS

| | | | | |
|---|---|---|---|---|
| 3,056,369 A | * | 10/1962 | Roth | ........................ 269/40 |
| 4,125,251 A | | 11/1978 | Jamieson, Jr. | |
| 5,388,316 A | * | 2/1995 | MacLaren | ................... 29/281.5 |
| 5,566,840 A | * | 10/1996 | Waldner et al. | ........... 211/41.17 |
| 6,361,035 B1 | * | 3/2002 | Collins | ........................ 269/45 |
| 6,511,574 B2 | * | 1/2003 | Barringer et al. | ............ 156/295 |
| 7,028,999 B2 | * | 4/2006 | Sunadome | .................... 269/47 |
| 2004/0051221 A1 | * | 3/2004 | Sunadome | .................... 269/47 |

FOREIGN PATENT DOCUMENTS

| | | |
|---|---|---|
| DE | 3437604 A1 | 10/1984 |
| DE | 8600856 U | 1/1986 |
| EP | 0338460 A1 | 4/1988 |
| GB | 0737693 A | 9/1955 |
| GB | 1217741 A | 12/1970 |

* cited by examiner

*Primary Examiner*—Lee D Wilson
(74) *Attorney, Agent, or Firm*—McCormick, Paulding & Huber LLP

(57) ABSTRACT

It is necessary to support components while machining is performed. In such circumstances work supports are now provided, whilst previously there was a dedicated arrangement for each component to be supported. By achieving a modularity in terms of adjustment through creating mountings comprising rings, arcs or bars secured upon posts a rigidity of presentation of support ends is achieved. By providing spacers for location about the posts on the mountings variability with regard to the positioning of the support ends is achieved such that similar geometry but different sized components and articles can be supported by the support arrangements. Furthermore, the spacers may be readily removed if C shaped, and the rings, arcs or bars can be shifted.

10 Claims, 3 Drawing Sheets

WORK SUPPORT

CROSS-REFERENCE TO RELATED APPLICATION

This application is entitled to the benefit of British Patent Application No. GB 0702087.8 filed on Feb. 3, 2007.

FIELD OF THE INVENTION

The present invention relates to work supports generally and more particularly to work supports used to support thin walled components such as casings whilst these components are machined.

BACKGROUND OF THE INVENTION

It will be appreciated that some components are generally cast or otherwise formed ready for final machining through such processes as milling and drilling. To facilitate such machining processes a support structure is required and so work support arrangements are designed for particular components. It will be appreciated in view of the nature of some components which may be thin walled it is typically necessary to avoid distortion and damage as a result of the machining forces. Thus, it is not unusual to provide dedicated support arrangements and fixtures for each component. Clearly, provision of such dedicated support arrangements lacks flexibility in terms of change over times to enable different components to be machined and so at least is inconvenient.

SUMMARY OF THE INVENTION

In accordance with aspects of the present invention, there is provided a work support arrangement comprising at least one post extending through a plurality of work support mounting blocks from which work supports extend to present support ends for engagement with an article in use, wherein the work support mounting blocks are separated by spacers to electively alter the position of the support ends, wherein the spacers have a generally hollow columnar form and a longitudinal slot for allowing passage of the post from the exterior of the spacer into the hollow. The spacers may be C shaped to envelope the post.

The mounting blocks may be annular and the work supports extend radially outwards.

Preferably, the spacers interlock with the mounting blocks either side in the work support arrangement. Preferably the spacers interlock through a recess (11) within the mounting block adapted to receive the spacer.

The mounting blocks may be displaceable whilst secured to the posts to allow removal of a spacer. Preferably the mounting blocks are liftable.

Preferably, the work support arrangement incorporates a base with the mountings extending upwardly from the base.

Preferably, the support ends are laterally displaceable by a hydraulic or pneumatic piston device.

DETAILED DESCRIPTION OF THE PREFERRED EMBODIMENTS

As indicated above, a support arrangement capable of accommodating a range of components with similar geometry but different sizes would be advantageous. An ability to adapt a modular support arrangement so that it can be re-configured quickly to support components with different heights and diameters would be beneficial. Clearly, support ends to engage a component or article to be machined or supported may be displaceable into engagement but nevertheless positioning of the support ends at different heights and diameters will be necessary.

Figure 1:
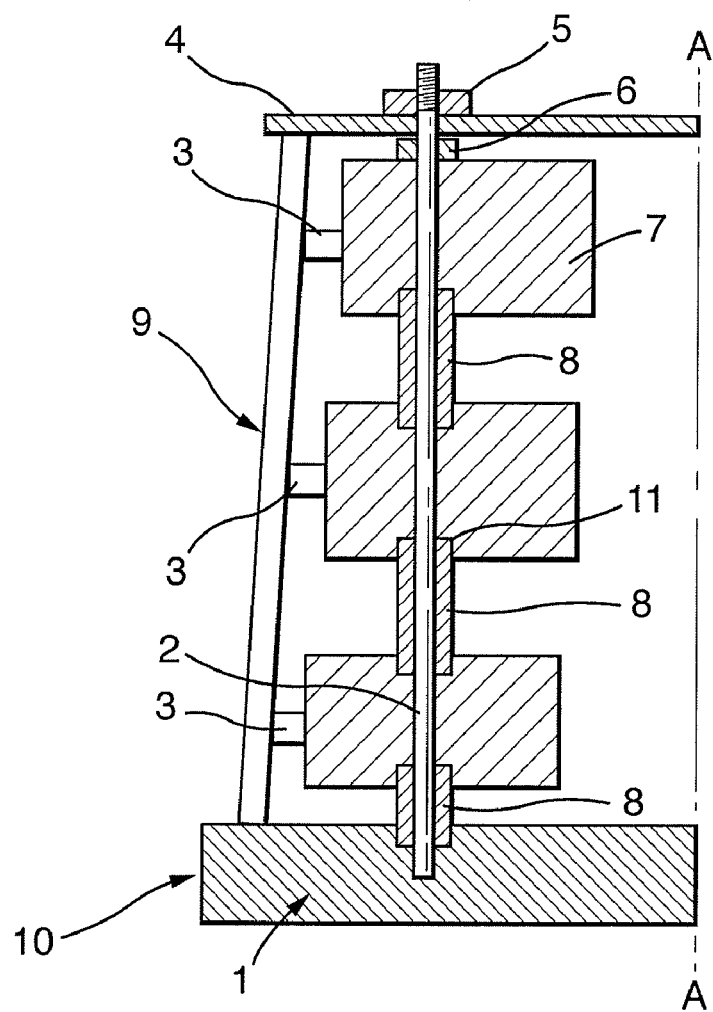
FIG. 1 is a schematic side view of a work support arrangement in accordance with aspects of the present invention.

FIG. 1 illustrates schematically as a side cross section a work support arrangement 10 in accordance with aspects of the present invention. The arrangement 10 comprises a base 1 upon which a mounting structure is created through an upright post 2 with rings 7 secured upon the posts 2. Each ring 7 incorporates at least one work support 3, which in turn is arranged to engage an article 9 such as a component having a thin walled surface. For illustration purposes, a cylindrical component 9 is illustrated and engaged by the work supports 3. Thus, a number of posts will be distributed about the base 1 to present the rings 7 by passing through those rings 7 at spaced circumferential positions.

The work supports 3 are bolted onto the respective ring 7. In such circumstances, it will be appreciated that the rings 7 extend along a circumference about an axis A-A with posts 2 at different positions as required. The posts 2 incorporate screw threads for engagement by a locking nut 6 to maintain assembly of the support arrangement and a further locking nut 5 which locks a lid 4 into engagement to normally capture the article 9 between the lid 4 and the base 1.

It will be appreciated that the work supports 3 may be bolted into the respective rings 7 at different positions on those rings 7 dictated by screw threads or other recesses. The work supports 3 may be simply plug elements which extend into recesses in the ring 7, or any other technique can be utilized in order to present the work supports 3. However, there will be a limited number of positions for the work supports within the ring and therefore in accordance with aspects of the present invention, spacers 8 are provided. These spacers 8 allow elective positioning of the ring 7 and therefore the work supports 3 relative to the article 9 to be supported. In such circumstances it will be appreciated articles 9 having the same general geometry but different sizes can be accommodated by altering the widths of the actual spacers 8 in use.

The central rings 7 are separated by the spacers 8 but retained in that separation by an interlock association. In such circumstances the spacers 8 are located within recesses 11 in the rings 7 to provide location and prevent slipping of the rings in use.

It will be appreciated that the number of central rings 7 and the number of work supports 3 on each of the central rings 7 as well as the height of the spacers are all dependent on the height, thickness and diameters of the article or component 9 to be made and the range of dimensions within the same component family, that is to say similar geometry but different sizes.

As indicated above, the central rings 7 and spacers 8 are built up in a stack from the base 1. This base 1 also acts as a platform upon which the article or component 9 rests. Typically, it is also convenient to aid locking of the article 9 in position to provide that the lid 4 is clamped down by a nut 5 as illustrated to capture the article 9.

The posts 2, as indicated, generally screw into the base 1 and are used to connect and locate the base 1 relative to the rings, spacers and top lid 4. Furthermore, the nut 5 is utilized to integrate the structure as described above such that the rings 7 and spacers 8 cannot move and therefore the position of the work supports locked once elective choice with regard to the position of these work supports 3 is achieved through choice of spacers 8 and rings 7.

Typically, in order to clamp the article 9 as indicated, that article 9 will be captured between the lid 4 and the base 1 with compression applied by the respective nut 5 upon a screw thread of one or more of the posts 2. This will increase rigidity of component 9 location to allow machining without displacement and/or distortion.

In order to alter the position of the support ends 3, as indicated above, generally different sized spacers 8 will be provided. In such circumstances, to accommodate different components the same general support arrangement can be used but with a dedicated set of spacers 8 for each specific component.

Figure 2:
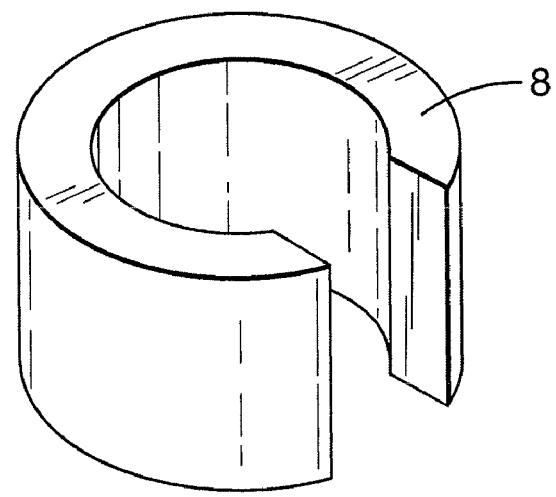
FIG. 2 is a top perspective view of a spacer in accordance with aspects of the present invention.

As illustrated in FIG. 2 generally the spacers 8 will be C shaped. In such circumstances if the rings 7 are displaced, that is to say lifted slightly and in order to release the interlock at the recesses 11 (FIG. 1), it will be possible to manipulate and slide the spacers 8 out from between the rings 7 and so enable a different sized spacer 8 to be located therebetween for a different article or component 9 (FIG. 1) to be supported. In such circumstances it is not necessary to completely disassemble the support arrangement 10 to allow support of different articles and components 9 (FIG. 1).

The above-described ability to alter the configuration of the support arrangement 10 without complete disassembly provides additional benefits where the work supports 3 are laterally displaceable. It will be appreciated that in order to accommodate different shapes for an article 9 it may be convenient to allow lateral displacement of the supports 3 to closely support the article 9 geometry. Such displacement may be achieved through pneumatic or hydraulic piston systems. These pneumatic and hydraulic piston systems will require pipes and hoses to facilitate displacement of the supports 3 in use. An arrangement that would require complete disassembly would therefore require disconnection of all these pipes etc. A work support arrangements in accordance with aspects of the present invention by not requiring such disassembly through use of C shaped spacers allows re-configuration of the arrangement 10 for different components without the potential problems associated with disconnecting and re-connecting pipes and hoses. In such circumstances, an arrangement 10 in accordance with aspects of the present invention will be less time consuming and prone to problems. It will also be understood that particular problems relate to a need to bleed hydraulic systems to prevent air traps in the displacement cylinders are avoided. If air is trapped in the hydraulic cylinders, the high pressure of the hydraulic cylinders can heat the air to a very high temperature which may impinge upon the component 9 causing damage.

The spacers 8 will typically be made from a suitable robust material such as a metal, ceramic or, where possible, plastic material. However, it will also be understood that these spacers 8 as well as other components of the arrangement 10 (FIG. 1) must be able to withstand the machining conditions for the component 9 and therefore suitable materials will be chosen.

Figure 3:
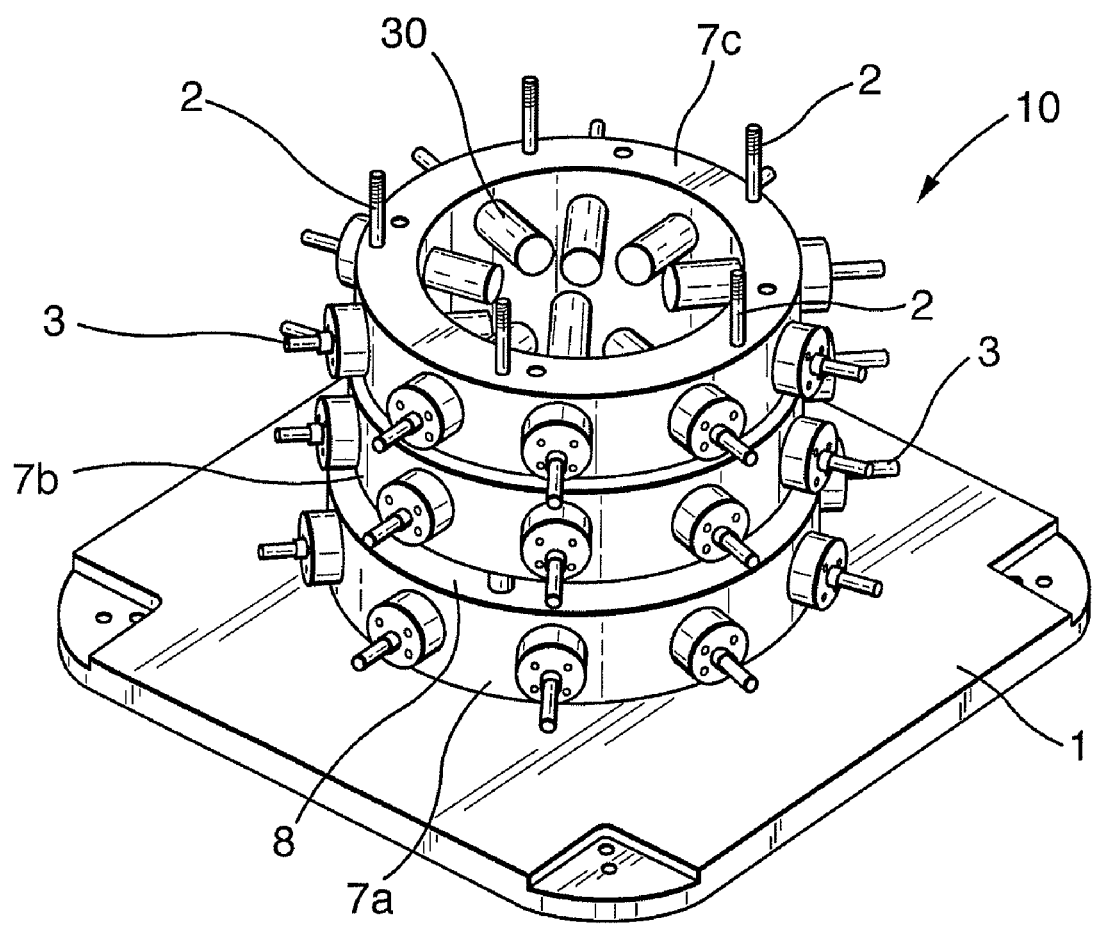
FIG. 3 is a schematic perspective view of one work support arrangement in accordance with aspects of the present invention.

FIG. 3 provides a front perspective schematic illustration of a work support arrangement 10 in accordance with aspects of the present invention. For clarity and comparison similar reference nomenclature to FIGS. 1 and 2 has been used but with the article/component 9 and lid 4 along with nuts 5 and 6 removed. As can be seen, the arrangement 10 is configured to accommodate a cylindrical article or component to be engaged by support ends 3 located upon mountings provided by rings 7 secured upon posts 2. In such circumstances the rings 7 are securely positioned through the posts 2 and therefore the support ends 3 rigidly presented. A spacer 8 is positioned between the bottom ring 7a and the intermediate ring 7b in order to create different positions for the support ends 3 as presented through the rings 7. The support ends 3 are also associated with hydraulic or pneumatic piston actuators 30 which can outwardly and laterally displace the ends 3 to assume a configuration for a particular component or article 9 to be presented upon the arrangement 10. It will be understood that the necessary pipe work and hosing for these hydraulic systems 30 will not require disconnection etc., on re-configuring of the work support arrangement 10. Such re-configuring of the work support arrangement 10 will simply be achieved by displacing through a lifting action the rings 7 in order to remove the spacer 8 and insert a different spacer or remove the spacer completely to achieve the necessary alteration in the outward support geometry of these support ends 3 in use.

Figure 4:
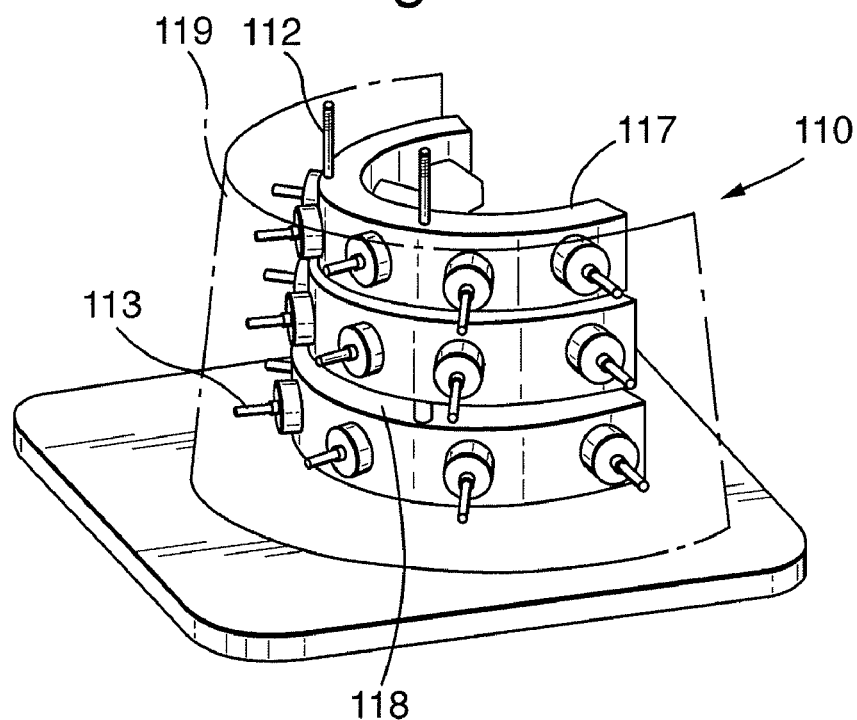
FIG. 4 is a front perspective view of a first alternative work support arrangement in accordance with aspects of the present invention; and, FIG. 5 is a front perspective view of a second alternative configuration of a work support arrangement in accordance with aspects of the present invention.

FIG. 4 illustrates a first alternative configuration of a support arrangement 110 with regard to aspects of the present invention. This configuration of the support arrangement 110 is similar to that described previously except the component 119 to be supported has an arc rather than a cylindrical nature. Nevertheless, as previously, rings 117 are secured and located upon posts 112 such that support ends 113 are presented to support the component or article 119. The position of the rings 117 and therefore the support ends 113 is altered through use of spacers 118 between the rings 117. Again, the spacers 118 can be removed or different sized spacers 118 inserted by simple displacement of the rings 117 upon the posts 112.

Figure 5:
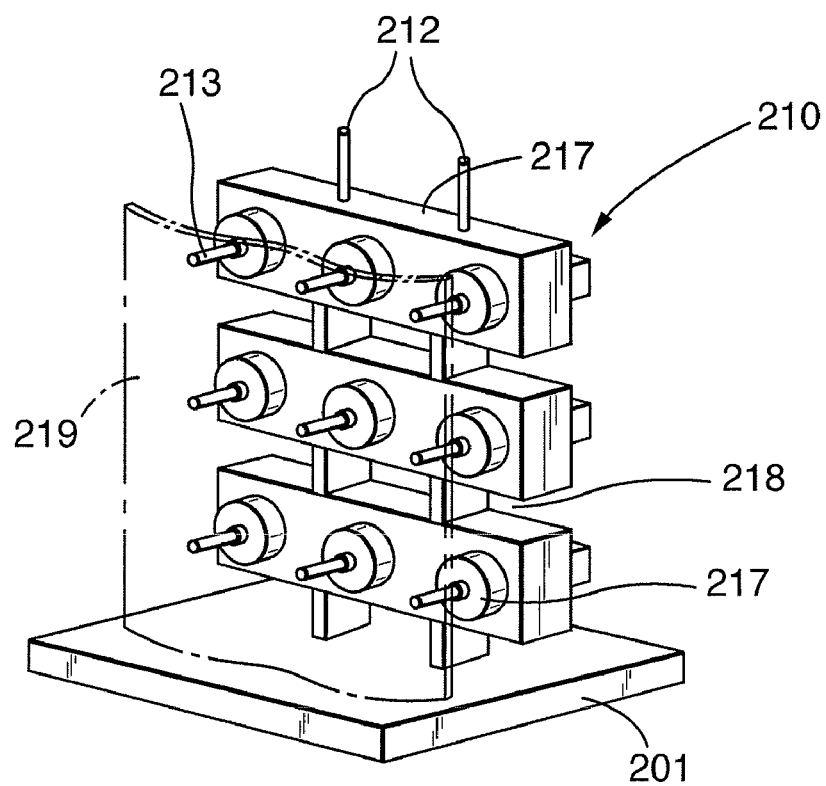

FIG. 5 provides a schematic illustration of a second alternative configuration of a work support arrangement 210 in accordance with aspects of the present invention. As previously, support ends 213 are located upon mountings provided by bars 217 located upon posts 212. About these posts 212, it will be understood spacers 218 are located to alter the position of the bars 217 and therefore the support ends 213 in accordance with aspects of the present invention. In such circumstances, an article or component 219 can be presented upon a base 201 and the position of these support ends 213 altered as required to provide support for that article 219. In such circumstances, as previously, in order to change the configuration of the work support arrangement 210 it will be appreciated that the bars 217 will simply be displaced, that is to say lifted to allow the spacers 218 to be removed or different sized spacers 218 located between them to alter the position of the support ends 213 electively as required for support of a particular component or article 219.

In view of the above, it will be appreciated that the work support arrangements in accordance with aspects of the present invention are of a generally modular nature with rings or bars utilized in association with posts and spacers to accommodate different heights and geometries of components and articles requiring support typically for machining. In such circumstances the flexibility of the support arrangement reduces costs and necessary change over time periods for the arrangements in accordance with aspects of the present invention. Through use of a C shaped spacer easy removal of the spacer from the arrangement is achieved to allow the rings to abut each other and therefore change the configuration or to allow a different spacer to be located between the rings or bars for different geometries in terms of presenting support ends. By a combination of recessed support rings/bars, a base, spacers and a through screw post and locking nuts it will be understood that the modularity and rigidity of the support structure is achieved such that machining processes can be applied to relatively thin walled articles supported appropriately by positioning support ends distributed about the article or component to be machined.

As indicated above, typically the support ends will be located upon rods associated with displaceable pistons in hydraulic and pneumatic systems. In such circumstances complete disassembly would not be convenient and therefore the ease of removal of spacers in accordance with aspects of the present invention is a particular advantage. It will be understood particularly with regard to thin walled components which may be symmetrical but have straight, conical, varying wall thickness or other irregularities provision of such lateral displacability with regard to these support ends is important. In such circumstances the present work support arrangement is particularly beneficial in allowing easier association of displaceable hydraulic and pneumatic systems within a support arrangement and allowing the flexibility of re-configuring without extensive disassembly.

Alterations and modifications to aspects of the present invention will be appreciated by those skilled in the art. In such circumstances, it will be understood that the respective rings in accordance with aspects of the present invention can provide a framework upon which differing numbers of support ends can be secured dependent upon the article or component to be supported. Furthermore, in addition to recessed association between the spacers and the rings or bars providing mountings in accordance with aspects of the present invention it will be understood that it is possible to use inter engagement between surface features or even magnetic association if required.

What is claimed is:

1. A work support comprising:
   a plurality of work support mounting blocks;
   at least one post extending through said plurality of work support mounting blocks;
   work supports extending from said work support mounting blocks to present work support ends for engagement with an article in use;
   wherein the work support mounting blocks are separated by spacers having a generally hollow columnar form and a longitudinal slot for allowing passage of the post from the exterior of the spacer into the spacer hollows, said spacers to electively alter the position of the support ends.

2. A work support according to claim 1, wherein the mounting blocks are annular and the work supports extend radially outwards.

3. An work support as claimed in claim 1, wherein the spacers are C shaped to envelope the post.

4. An work support as claimed in claim 1, wherein the spacers interlock with the mounting blocks either side in the work support arrangement.

5. An work support as claimed in claim 1, wherein the spacers interlock through a recess (11) within the mounting block adapted to receive the spacer.

6. An work support as claimed in claim 1, wherein the mounting blocks are displaceable whilst secured to the posts to allow removal of a spacer.

7. An work support as claimed in claim 6 wherein the mounting blocks are liftable.

8. An work support as claimed in claim 1, wherein the work support arrangement incorporates a base with the mountings extending upwardly from the base.

9. An work support as claimed in claim 1, wherein the support ends are laterally displaceable.

10. An work support as claimed in claim 9, wherein the support ends are laterally displaceable by a hydraulic or pneumatic piston device.

* * * * *